Patented Jan. 12, 1943

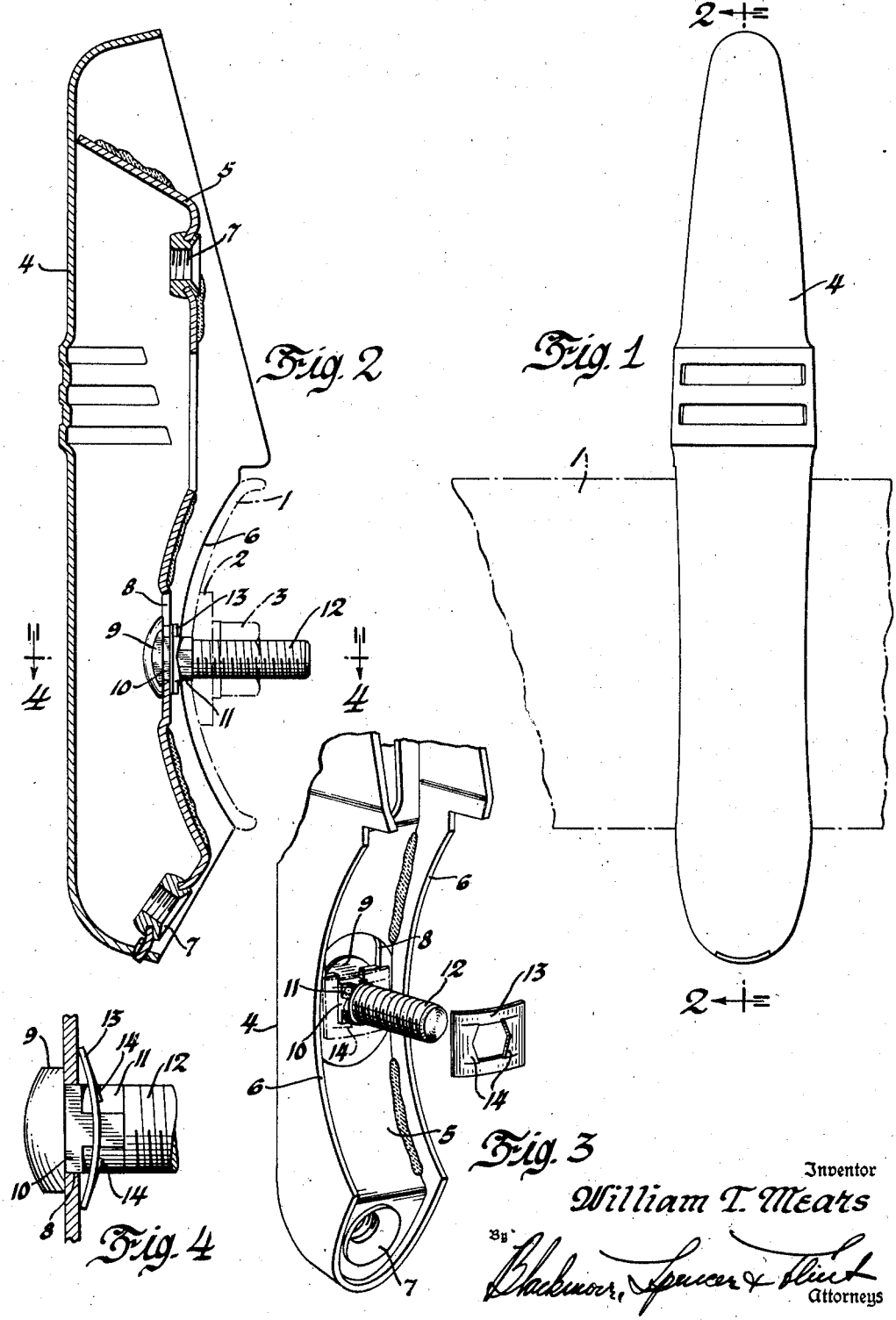

2,308,094

UNITED STATES PATENT OFFICE 2,308,094

BUMPER GUARD

William T. Mears, Anderson, Ind., assignor to General Motors Corporation, Detroit, Mich., a corporation of Delaware Application March 17, 1941, Serial No. 383,786

2 Claims. (Cl. 293—55)

This invention relates to vertical bumper guards to be fastened on the regular impact bar of an automobile for increasing the range of protection. More particularly the invention relates to the type of guard which is hollow and made up of sheet metal stampings welded together and to the attachment and retention of a fastening bolt as a part of the guard sub-assembly and through which the guard is mounted and the impact bar and its supporting bracket are joined.

It is an object of the invention to provide an arrangement wherein the fastening bolt can be easily and securely fixed to the guard as a sub-assembly therewith subsequent to the completion of all manufacturing operations on the guard so as to eliminate the interference of a projecting stud in handling the guard during the welding, plating, buffing and other manufacturing operations and to eliminate also the coating on the bolt of the electrically deposited and costly plating metal which not only would be wasted but would tend to clog the screw threads.

A further object is to enable the attachment bolt to be added to the finished hollow guard and located quickly and positively against accidental separation during shipping and handling of the assembly and to keep the bolt from being displaced inwardly into the hollow guard while it is being applied to the automobile and to hold it against rotation as its fastening nut is threaded thereon.

Additional objects will become apparent during the course of the following specification having reference to the accompanying drawing wherein Figure 1 is a front elevation of the supplemental guard mounted on the bumper assembly; Figure 2 is a vertical sectional view of the guard taken on line 2—2 of Figure 1; Figure 3 is a perspective view showing the bolt retainer about to be applied to the bolt and Figure 4 is a sectional view taken on line 4—4 of Figure 2.

The main impact bar which extends transversely across either end of the automobile is indicated in the drawing in dotted lines at 1 and its secondary bar or supporting bracket is shown at 2. A fastening nut 3 is threaded on the stud which holds the bumper bars together and also mounts the vertical guard illustrated in the drawing as a hollow assembly comprising stamped metal plates 4 and 5 welded together. The front or impact piece 4 is pressed to a channel section and its vertical side flanges are provided with concave seating depressions 6—6 to fit the convex front face of the impact member 1. The stamping 5 constitutes an attachment plate and is located within and welded to the side flanges of the front stamping 4. Near its top and bottom the attachment plate has secured thereon by peening or the like a pair of threaded nuts 7 for the attachment of top and bottom cross bars, not shown, which augment the vertical guards and in some instances serve for mounting the vehicle license plate.

At an intermediate point the attachment plate 5 is provided with a keyhole or T-shaped slot 8. The upper or wider portion of the slot allows the passage through the plate and into the hollow space of the guard of the head 9 of a carriage bolt which has a squared neck portion 10 immediately adjacent the head to fit non-rotatably within the restricted or narrower portion of the slot 8. Immediately beyond the squared portion 10 the bolt shank has a smooth substantially cylindrical portion 11 which may be formed by dressing down the corners of the squared shank and the bolt terminates in the threaded portion 12 to be engaged by the securing nut 3.

Embracing the bolt is a thin retainer disc or bowed plate-like collar 13 having a pair of oppositely disposed spring feet or one-way clutching elements 14—14 which enable axial application of the plate to the bolt and wedgedly engage the peripheral surface of the cylindrical portion 11 of the carriage bolt with the opposite edges of the bowed plate bearing against the outermost face of the attachment plate 5 and cooperating with the bolt head 9 to sandwich therebetween the attachment plate. The purpose of the retainer plate is to locate the bolt against displacement during handling and hold it securely when the bumper parts are being assembled so that the squared shank portion of the bolt will be maintained non-rotatably within the keyhole slot to facilitate drawing up the fastening nut 3.

I claim:

1. In combination with a hollow member for bolting attachment to another member, an attachment bolt having a head and a shank, said shank including a polygonal neck portion immediately under the head, an intermediate cylindrical portion beyond the polygonal neck and a threaded terminal nut receiving and attaching portion; a mounting plate forming a wall of said hollow member and having a polygonal opening through which the bolt extends with the bolt head on the inner side of said plate and with the threaded terminal and intermediate cylindrical portion projected beyond the plate on the opposite side thereof, the polygonal neck portion being non-rotatably fitted in said opening; and a clutch collar embracing and gripping said cylindrical portion and bearing on the outer face of said plate to retain the parts in the relation aforesaid as a subassembly and to hold the bolt against displacement inwardly of the hollow member, and thereby to facilitate subsequent attachment of said members upon insertion of the projecting threaded terminal nut receiving portion through the other member and application thereto of an attachment nut.

2. A sub-assembly bumper structure comprising an attachment bolt having a head and a shank, said shank including a polygonal neck portion under the head and a threaded terminal nut receiving and attaching portion, a hollow bumper guard formed with a wall having a polygonal opening through which the bolt extends with the bolt head on the inner side of said wall and with the threaded terminal portion projected beyond the wall on the opposite side thereof, the polygonal neck portion being non-rotatably fitted in said opening, and a clutch collar bearing on the outer face of said wall and having a resilient tongue gripping said shank to retain the parts in the aforesaid relation and to hold the bolt against displacement inwardly of the guard, and thereby to facilitate subsequent attachment of the subassembly to a bumper upon insertion of the projecting threaded terminal nut receiving portion through the bumper and upon application thereto of an attachment nut.

WILLIAM T. MEARS.